US008449096B2

(12) United States Patent  (10) Patent No.: US 8,449,096 B2
Birau et al.  (45) Date of Patent: May 28, 2013

(54) FIVE MEMBER RING STABILIZERS FOR QUINACRIDONE-TYPE PIGMENTS IN SOLID INK

(75) Inventors: M. Maria Birau, Mississauga (CA); C. Geoffrey Allen, Waterdown (CA); Marcel P. Breton, Mississauga (CA); Carol A. Jennings, Etobicoke County (CA); Caroline M. Turek, Mississauga (CA); James D. Mayo, Mississauga (CA); Raymond W. Wong, Mississauga (CA); Yvonne Wong, legal representative, Mississauga (CA); Adela Goredema, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 332 days.

(21) Appl. No.: 12/961,082

(22) Filed: Dec. 6, 2010

(65) Prior Publication Data
US 2012/0140001 A1 Jun. 7, 2012

(51) Int. Cl.
*G01D 11/00* (2006.01)
(52) U.S. Cl.
USPC ........................................... 347/99; 347/100
(58) Field of Classification Search
USPC .......... 347/100, 95, 96, 101, 102, 103, 88, 347/99, 105, 20, 22, 21, 9; 106/31.6, 31.13, 106/31.27; 523/160, 161
See application file for complete search history.

(56) References Cited

U.S. PATENT DOCUMENTS

| 3,386,843 | A | * | 6/1968 | Jaffe et al. ..................... 106/495 |
| 4,830,671 | A | | 5/1989 | Frihart et al. |
| 4,889,560 | A | | 12/1989 | Jaeger et al. |
| 4,889,761 | A | | 12/1989 | Titterington et al. |
| 5,122,187 | A | | 6/1992 | Schwarz et al. |
| 5,194,638 | A | | 3/1993 | Frihart et al. |
| 5,372,852 | A | | 12/1994 | Titterington et al. |
| 5,597,856 | A | | 1/1997 | Yu et al. |
| 5,782,996 | A | | 7/1998 | Fan |
| 6,152,968 | A | * | 11/2000 | Etzbach et al. ................... 8/638 |
| 6,174,937 | B1 | | 1/2001 | Banning et al. |
| 6,224,661 | B1 | * | 5/2001 | Tregub et al. .............. 106/31.61 |
| 6,309,453 | B1 | | 10/2001 | Banning et al. |
| 6,380,423 | B2 | | 4/2002 | Banning et al. |
| 6,464,766 | B1 | | 10/2002 | Banning et al. |
| 6,620,228 | B1 | | 9/2003 | King et al. |
| 6,702,884 | B2 | * | 3/2004 | Brown ....................... 106/31.61 |
| 6,827,768 | B2 | * | 12/2004 | Andrievsky et al. ......... 106/31.6 |
| 6,855,193 | B2 | * | 2/2005 | Andrievsky et al. ......... 106/31.6 |
| 6,858,070 | B1 | | 2/2005 | Wong et al. |
| 6,860,930 | B2 | | 3/2005 | Wu et al. |
| 6,906,118 | B2 | | 6/2005 | Goodbrand et al. |
| 7,293,868 | B2 | * | 11/2007 | Odell et al. .................... 347/100 |
| 7,407,539 | B2 | | 8/2008 | Wu et al. |
| 2008/0098929 | A1 | | 5/2008 | Turek et al. |
| 2008/0297556 | A1 | | 12/2008 | Turek et al. |

FOREIGN PATENT DOCUMENTS

| EP | 0 851 005 B1 | 7/1998 |
| EP | 1 146 094 A2 | 10/2001 |
| GB | 2 238 792 A | 6/1991 |
| WO | WO 02/48269 A1 | 6/2002 |

OTHER PUBLICATIONS

Filho et al., "Crystalline modifications of linear trans-quinacridone pigments", Journal of Materials Science, 1992, pp. 5101-5107, vol. 27.
Katritzky et al., "The sulfonation of aromatic and heteroaromatic polycyclic compounds," Tetrahedron, 2009, pp. 111-1114, vol. 65.

* cited by examiner

*Primary Examiner* — Manish S Shah
(74) *Attorney, Agent, or Firm* — Oliff & Berridge, PLC

(57) ABSTRACT
A synergist for pigment in a solid ink having the following formula:
Formula (4)
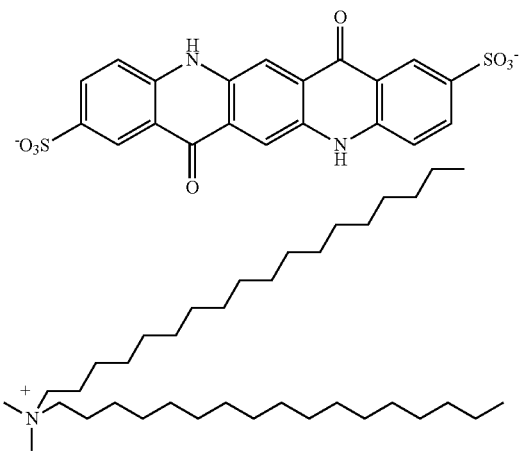
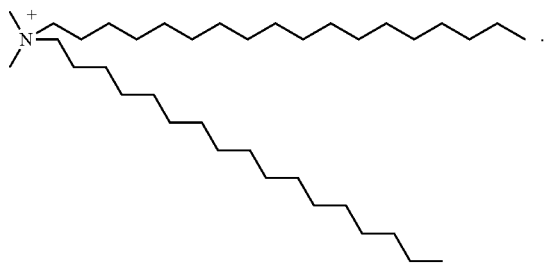
13 Claims, 1 Drawing Sheet

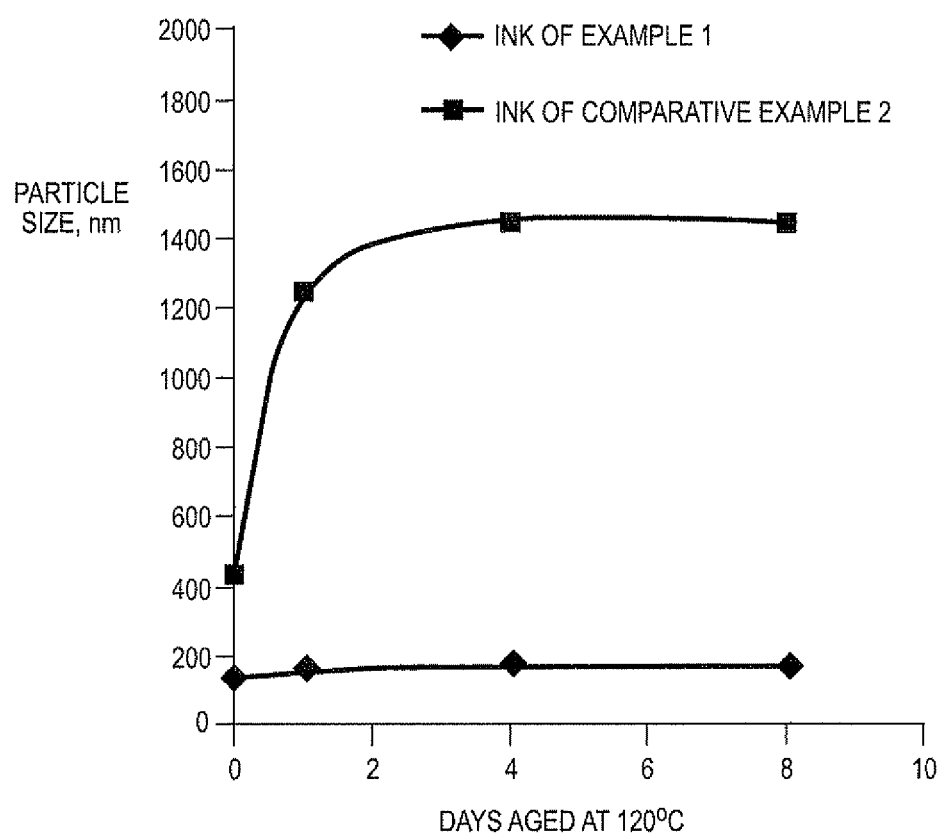

FIVE MEMBER RING STABILIZERS FOR QUINACRIDONE-TYPE PIGMENTS IN SOLID INK

BACKGROUND

This disclosure is directed to stabilizers for pigments in solid inks. More specifically, this disclosure is directed to five member ring stabilizers for quinacridone-type pigments in solid inks.

Inkjet printing systems and solid inks are known in the art. However, while known solid ink compositions are used successfully, a need remains for improved dispersion of pigments in solid inks.

To enable dispersion of the pigments in media, a dispersant or combination of dispersants may optionally be provided. Typically, dispersants may be used to stabilize particles in a non-polar ink vehicle. The dispersant generally comprises first functional groups that anchor the dispersant to the pigment particles and second functional groups that are compatible with the ink vehicle. The first functional groups can suitably anchor or adsorb to the pigment particle in any suitable manner, such as hydrogen bonding, chemical bonding, acid-base reaction, Van der Waals interactions, and the like.

However, many organic pigments disperse with difficulty in non-polar media. One approach for dispersing pigments into non-polar media is by modifying the surface of the pigments by addition of compounds known as synergists. A pigment stabilizer or synergist works by enhancing the attachment of the dispersant onto the pigment. Therefore, it is desirable for the stabilizer to have the same basic chemical structure as the pigment, but substituted by a functional group, such as a sulfonic acid group.

However, obtaining stabilizers for use in solid ink compositions has not been fully explored, and there remains a need to develop stabilizers for organic pigments, particularly quinacridone-type pigments, for use in non-polar solid ink compositions.

SUMMARY

The present disclosure addresses these and other needs, by providing a synergist for quinacridone-type pigments that may be used in ink compositions, such as solid ink composition, to disperse the quinacridone-type pigment into the ink vehicle. The ink vehicle may include wax, mixtures of waxes, resins, mixtures of resins, and/or optional additives.

In an embodiment, the disclosure provides a compound having the following general formula (1):

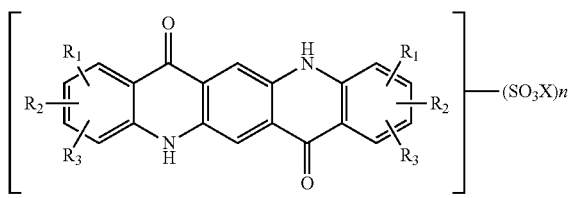

Formula (1)

wherein n is 1, 2, 3, or 4, X represents a metal, ammonium, or quaternary ammonium, $R_1$, $R_2$, and $R_3$ independently represent H, $C_1$-$C_{20}$ alkyl, $C_1$-$C_{20}$ alkoxy, and halogen.

In another embodiment, the disclosure provides an ink composition including an ink vehicle; a pigment, a dispersant; and a synergist having the above general formula (1).

BRIEF DESCRIPTION OF THE DRAWING

FIG. 1 is a graph showing the stability of an ink prepared with a synergist according to an embodiment compared to the stability of an ink prepared with a commercially available synergist.

EMBODIMENTS

Many organic pigments are difficult to disperse in non-polar media that are used in various inks. In particular, quinacridone pigments are generally very difficult to disperse and stabilize in low-polarity waxes and resins used in various solid ink compositions. One approach for improving dispersement of the pigments is changing the surface of the pigments by addition of compounds commonly referred to as synergists.

A synergist or a pigment stabilizer is a compound that promotes the adsorption of the polymeric dispersant onto the pigment. For example, in the case of a cationic dispersant, the dispersant anchor is comprised of a positive charge and will interact with an anionic group present on the synergist, exchanging counter ions and promote an anchoring of the dispersant onto the modified pigment surface. For example, in embodiments, synergists having sulfonic groups are absorbed onto the pigment. The sulfonic groups react with dispersants that have nitrogen end groups. The sulfonic end groups of the synergist and the nitrogen end groups of the dispersants interact, exchanging counter ions and promoting an anchoring of the dispersant onto the modified pigment surface.

It is desirable that the pigment and the synergist have the same general structure because the synergist will more readily absorb into the pigment. This allows the ink to maintain the integrity of its color while adding a synergist that promotes distribution of the pigment within the dispersant or ink vehicle.

The following documents provide background information:

EP 1 146 094 A2 discloses an aqueous pigment dispersion comprising: (a) 100 parts per weight pigment; (b) 3 to 30 parts per weight of at least one sulfonic acid group containing a derivative of a pigment of the same type as (a); and (c) water, wherein (i) component (b) comprises a pigment derivative which has only one sulfonic group in each molecule, (ii) at least part of the pigment derivative (b) is present, in the dispersion, in the form of a sulfonic acid salt selected from an ammonium salt, an organic amine salt, and a salt with a monovalent metal, provided that at least 15% of the sulfonic acid groups do not form a salt with the monovalent metal, and (iii) the dispersion contains 500 ppm or less of solid metal ions having a valence of at least 2.

WO 02/48269 A1 discloses a compound of the 1-aminoanthraquinone, anthanthrone, anthrapyrimidine, quinacridone, dioxazine, diketopyrrolopyrrole, flavanthrone, indanthrone, isoindolinone, isoviolanthrone, perinone, perylene, phthalocyanine, pyranthrone or thioindigo series. The compound has one or more sulfonate groups of formula (1)

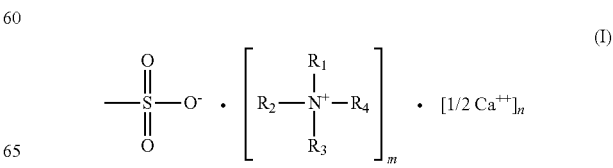

(I)

wherein $R_1$ is methyl or ethyl, $R_2$, and $R_3$ are each, independently of each other, $C_6$-$C_{24}$ alkyl, or $C_6$-$C_{24}$ alkenyl, m is a number from 0.3 to 1, and n is a number from 0 to m. The compound is suitable for use as a pigment dispersant and a rheology improver. Also disclosed are modified pigments having the compound on their surface, pigment compositions comprising the compound, and dispersions comprising the compound.

EP 0 851 005 B1 relates to an agglomerated pigment, a process for producing the agglomerated pigment, an aqueous pigment dispersion, and a water-based ink composition. Use of the agglomerated pigment readily gives an aqueous pigment dispersion in which the pigment is in a satisfactorily dispersed state and, after preparation, undergoes little change in viscosity or pigment particle diameter during storage. This aqueous pigment dispersion can be used as a colorant for water-based inks such as ink-jet printer inks, writing utensils inks, etc.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

As used herein, the term "viscosity" refers to a complex viscosity, which is the typical measurement provided by a mechanical rheometer capable of subjecting a sample to a steady shear strain or a small amplitude sinusoidal deformation. In this type of instrument, the shear strain is applied by the operator to the motor and the sample deformation (torque) is measured by the transducer. Alternatively, a controlled-stress instrument, where the shear stress is applied and the resultant strain is measured, may be used. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and i is $\sqrt{-1}$. Alternatively a viscometer that can measure only the transient measurement of, for instance, a capillary or shear viscosity can also be used.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

Ink Vehicles

In embodiments, the solid ink may include at least one ink vehicle (also known as a carrier material) or a mixture of two or more ink vehicles. The ink vehicle may comprise polymers, copolymers, waxes, and resins. As used herein, the ink vehicle does not comprise colorants, dispersants, synergists, antioxidants, or other additives discussed below.

The ink vehicle or mixture is solid at temperatures of about 20° C. to about 27° C., for example room temperature, and specifically is solid at temperatures below about 40° C. However, the ink vehicle changes phase upon heating, and is in a molten state at jetting temperatures at or above about 100° C.

In embodiments, the ink vehicle may have a melting point of from about 60° C. to about 150° C., for example from about 80° C. to about 120° C., from about 85° C. to about 110° C., from about 100° C. to about 110° C., or from about 105° C. to about 110° C. as determined by, for example, observation and measurement on a microscope hot stage, wherein a binder material is observed by Differential Scanning Calorimetry. Higher melting points are also acceptable, although printhead life may be reduced at temperatures higher than 150° C.

Any suitable ink vehicle can be employed. Suitable vehicles may include ethylene/propylene copolymers, highly branched hydrocarbons, hydrocarbon-based waxes, paraffins, high molecular weight linear alcohols, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below, and mixtures thereof.

Examples of suitable specific ink vehicles include, for example, polyethylene, such as those available from Baker Petrolite having the following general formula:

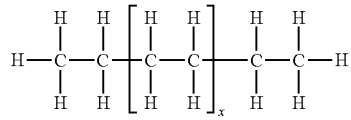

wherein x is an integer of from about 1 to about 200, such as from about 5 to about 150 or from about 12 to about 105. These materials may have a melting point of from about 60° C. to about 150° C., such as from about 70° C. to about 140° C., or from about 80° C. to about 130° C.; and a molecular weight (Mn) of from about 100 to about 5,000 g/mol, such as from about 200 to about 4,000g/mol, or from about 400 to about 3,000g/mol. Examples of wax ink vehicles include POLYWAX 400 (Mn about 400), distilled POLYWAX 400 having a viscosity of about 10% to about 100% higher than the viscosity of the undistilled POLYWAX 400 at about 110° C., POLYWAX 500 (Mn about 500 g/mol), distilled POLYWAX 500 having a viscosity of about 10% to about 100% higher than the viscosity of the undistilled POLYWAX 500 at about 110° C., POLYWAX 655 (Mn about 655g/mol), distilled POLYWAX 655 having a viscosity of about 10% to about 50% lower than the viscosity of the undistilled POLYWAX 655 at about 110° C., and distilled POLYWAX 655 having a viscosity of about 10% to about 50% higher than the viscosity of the undistilled POLYWAX 655 at about 110° C., POLYWAX 850 (Mn about 850g/mol), POLYWAX 1000 (Mn about 1,000g/mol), and the like. In embodiments, the polyethylene wax may be a polyethylene was as disclosed in U.S. Pat. No. 7,407,539, the disclosure of which is incorporated herein in its entirety.

Further examples include ethylene/propylene copolymers, such as those available from Baker Petrolite having the following general formula:

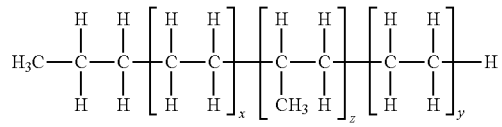

wherein z represents an integer from 0 to about 30, such as from 0 to about 20 or from 0 to about 10, y represents an integer from 0 to about 30, such as from 0 to about 20 or from 0 to about 10; and x is equal to about 21−y. The distribution of the side branches may be random along the carbon chain. The copolymers may have, for example, a melting point of from about 70° C. to about 150° C., such as from about 80° C. to about 130° C. or from about 90° C. to about 120° C.; and a molecular weight range of from about 500 to about 4,000. Commercial examples of such copolymers include, for example, Petrolite CP-7 (Mn=650 g/mol), Petrolite CP-11 (Mn=1,100 g/mol), Petrolite CP-12 (Mn=1,200 g/mol), and the like.

Additional examples include highly branched hydrocarbons, typically prepared by olefin polymerization, such as the VYBAR materials available from Baker Petrolite, including VYBAR 253 (Mn=520 g/mol), VYBAR 5013 (Mn=420 g/mol), and the like. Another type of ink vehicle may be n-paraffinic, branched paraffinic, and/or aromatic hydrocarbons, typically with from about 5 to about 100, such as from about 20 to about 180 or from about 30 to about 60, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Baker Petrolite.

Another example includes modified maleic anhydride hydrocarbon adducts or polyolefins prepared by graft copolymerization, such as those available from Baker Petrolite and of the following general formulas:

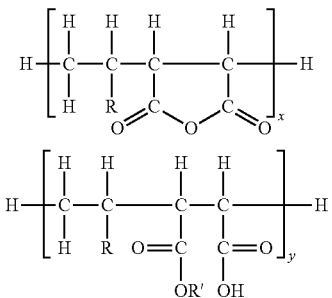

wherein R is an alkyl group with from about 1 to about 50, such as from about 5 to about 35 or from about 6 to about 28 carbon atoms; R' is an ethyl group, a propyl group, an isopropyl group, a butyl group, an isobutyl group, or an alkyl group with from about 5 to about 500, such as from about 10 to about 300 or from about 20 to about 200 carbon atoms; x is an integer of from about 9 to about 13; and y is an integer of from about 1 to about 50, such as from about 5 to about 25 or from about 9 to about 13. The above materials have melting points of from about 50° C. to about 150° C., such as from about 60° C. to about 120° C. or from about 70° C. to about 100° C.

The above materials also include those materials available from Baker Petrolite and of the general formula

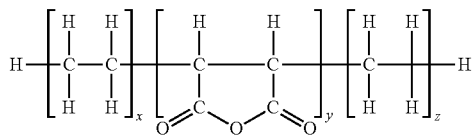

wherein x is an integer of from about 1 to about 50, such as from about 5 to about 25 or from about 9 to about 13; y is 1 or 2; and z is an integer of from about 1 to about 50, such as from about 5 to about 25 or from about 9 to about 13.

The above materials also include those available from Baker Petrolite and of the general formula

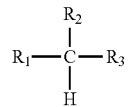

wherein $R_1$ and $R_3$ are hydrocarbon groups and $R_2$ is either of one of the general formulas

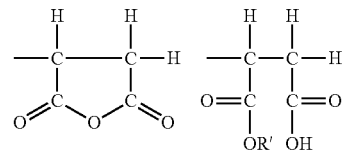

or a mixture thereof, wherein R' is an isopropyl group. The materials may have melting points of from about 7020 C. to about 150° C., such as from about 80° C. to about 130° C. or from about 90° C. to about 125° C., with examples of modified maleic anhydride copolymers including CERAMER 67(Mn=655 g/mol, Mw/Mn=1.1), CERAMER 1608(Mn= 700 g/mol, Mw/Mn=1.7), and the like.

Further examples include high molecular weight linear alcohols, such as those available from Baker Petrolite and of the general formula

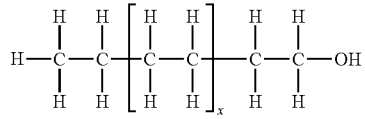

wherein x is an integer of from about 1 to about 50, such as from about 5 to about 35 or from about 11 to about 23. These materials may have a melting point of from about 50° C. to about 150° C., such as from about 70° C. to about 120° C. or from about 75° C. to about 110° C.; and a molecular weight range of from about 100 to about 5,000, such as from about 200 to about 2,500 or from about 300 to about 1,500. Commercial examples include the UNILIN materials such as UNILIN 425 (Mn=460 g/mol), UNILIN 550 (Mn=550 g/mol), UNILIN 700 (Mn=700 g/mol), and the like.

In addition, the ink vehicle may be an ethoxylated alcohol, such as available from Baker Petrolite and of the general formula

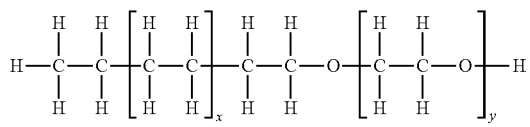

wherein x is an integer of from about 1 to about 50, such as from about 5 to about 40 or from about 11 to about 24; and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight range of from about 100 to about 5,000, such as from about 500 to about 3,000 or from about 500 to about 2,500. Commercial examples include UNITHOX 420 (Mn=560 g/mol), UNITHOX 450 (Mn=900 g/mol), UNITHOX 480 (Mn=2,250 g/mol), UNITHOX 520 (Mn=700 g/mol), UNITHOX 550 (Mn=1,100g /mol), UNITHOX 720 (Mn=875 g/mol), UNITHOX 750 (Mn=1,400 g/mol), and the like.

In addition, the ink vehicles described in U.S. Pat. No. 6,906,118, incorporated herein by reference in its entirety, may also be used. Also suitable as ink vehicles are liquid crystalline materials as disclosed in, for example, U.S. Pat. No. 5,122,187, the disclosure of which is incorporated herein by reference in its entirety.

Urethane, urea, amide and imide derivatives of oxidized synthetic or petroleum waxes, such as those available from Baker Petrolite having the following general formulas may also be used as the ink vehicle:

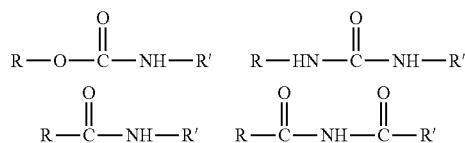

wherein R is an alkyl group of the formula $CH_3(CH_2)_n$; n is an integer of from about 5 to about 400, such as from about 10 to about 300 or from about 20 to about 200; and R' is a tolyl group. In embodiments, the urethane, urea, amide and imide derivatives may be linear, branched, cyclic, and any combination thereof. These materials may have a melting point of from about 60° C. to about 120° C., such as from about 70° C. to about 100° C. or from about 70° C. to about 90° C. Commercial examples of such materials include, for example, bis-urethanes such as PETROLITE CA-11, PETROLITE WB-5, and PETROLITE WB-17, all available from Baker Petrolite, and the like. Suitable examples also include urethane, urea, amide and imide derivatives disclosed in U.S. Pat. Nos. 6,620,228; 6,380,423; 6,464,766; and 6,309,453, each of which is incorporated herein by reference.

Additional resins and waxes may further be selected from the group consisting of a urethane resin obtained from the reaction of two equivalents of ABITOL E hydroabietyl alcohol and one equivalent of isophorone diisocyanate, prepared as described in U.S. Pat. No. 5,782,996, the disclosure of which is totally incorporated herein by reference; a urethane resin that was the adduct of three equivalents of stearyl isocyanate and a glycerol base alcohol, prepared as described in Example 4 of U.S. Pat. No. 6,309,453 the disclosure of which is totally incorporated herein by reference; and suitable amides including, for example, diamides, triamides, tetra-amides, cyclic amides, and the like. Fatty amides including monoamides, tetra-amides, and mixtures thereof, may also be included in the ink vehicle such as, for example, those described in U.S. Pat. Nos. 4,889,560; 4,889,761; 5,194,638; 4,830,671; 6,174,937; 5,372,852; 5,597,856; and 6,860,930 and British Patent No. GB 2 238 792, the entire disclosures of each are incorporated herein by reference; and those similar to what is described in U.S. Pat. No. 6,620,228, which is incorporated herein by reference in its entirety.

Fatty amides, such as monoamides, tetra-amides, mixtures thereof, and the like, such as those described in U.S. Pat. No. 6,858,070, incorporated herein by reference, may also be used. Suitable monoamides may have a melting point of at least about 50° C., for example from about 50° C. to about 150° C., although the melting point can be below this temperature. Specific examples of suitable monoamides include primary monoamides and secondary monoamides. Exemplary primary monoamides include stearamide, such as KEMAMIDE S available from Chemtura Corp. and CRODAMIDE S available from Croda; behenamide/arachidamide, such as KEMAMIDE B available from Chemtura and CRODAMIDE BR available from Croda; oleamide, such as KEMAMIDE U available from Chemtura and CRODAMIDE OR available from Croda, technical grade oleamide, such as KEMAMIDE 0 available from Chemtura, CRODAMIDE 0 available from Croda, and UNISLIP 1753 available from Uniqema; and erucamide such as KEMAMIDE E available from Chemtura and CRODAMIDE ER available from Croda, Exemplary secondary amides include behenyl behenamide, such as KEMAMIDE EX666 available from Chemtura; stearyl stearamide, such as KEMAMIDE S-180 and KEMAMIDE EX-672 available from Chemtura; stearyl erucamide, such as KEMAMIDE E-180 available from Chemtura and CRODAMIDE 212 available from Croda; erucyl erucamide, such as KEMAMIDE E-221 available from Chemtura; oleyl, palmitamide, such as KEMAMIDE P-181 available from Chemtura and CRODAMIDE 203 available from Croda; and erucyl stearamide, such as KEMAMIDE S-221 available from Chemtura. Additional suitable amide materials include KEMAMIDE W40 (N,N'-ethylenebisstearamide), KEMAMIDE P181 (oleyl palmitamide), KEMAMIDE W45 (N,N'-thylenebisstearamide), and KEMAMIDE W20 (N,N'-ethylenebisoleamide).

Further resins suitable for use herein include triamides, such as those disclosed in U.S. Pat. No. 6,860,930 and U.S. Patent Application Publication No. 2008/0098929 (the entire disclosures of which are incorporated herein by reference). Triamides suitable for use include linear triamides, which are molecules in which all three amide groups are contained within a single hydrocarbon backbone. Examples of linear triamides include those triamides having the following formulas:

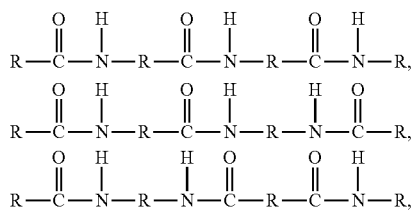

R can be any hydrocarbon having from about 1 to about 200 carbon atoms, such as from about 25 to 150 or from about 30 to about 100.

Linear triamides can further include those wherein a line can be drawn through the three amide groups, even if one would ordinarily draw a different line. One example of such a triamide can be expressed by the following formula:

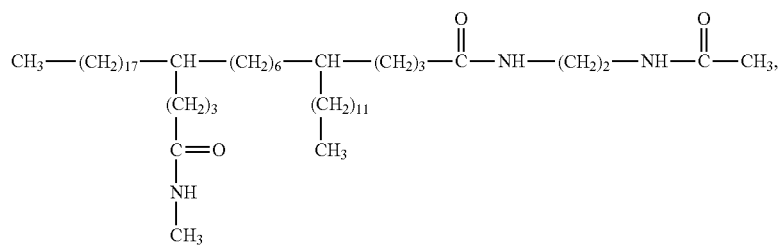

which can also be drawn as:

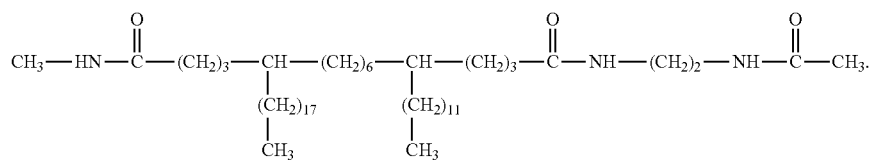

In embodiments, the triamide may also be a branched triamide. Examples of suitable branched triamides include those triamides disclosed in U.S. Pat. No. 6,860,930 and U.S. Patent Application Pub. No. 2008/0297556, each of which are incorporated herein in their entirety by reference. Any branched triamide disclosed in U.S. Pat. No. 6,860,930 and U.S. Patent Application Pub. No. 2008/0297556, is suitable for use herein.

Additional examples of suitable ink vehicles for the solid inks include rosin esters, such as glyceryl abietate (KE-100®); polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long-chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide); and the like. Further, linear long-chain sulfones with from about 4 to about 16 carbon atoms, such as diphenyl sulfone, n-amyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, chlorophenyl methyl sulfone, and the like, are suitable ink vehicle materials.

The ink vehicle may comprise from about 50 to about 99 by weight of the ink composition, such as from about 75 to about 98, from about 85 to about 97, or from about 90 to about 96.

Colorants

Colorants or pigments as used herein include pigment, dye, mixtures of pigment and dye, mixtures of pigments, mixtures of dyes, and the like. For simplicity, the term "colorant" as used herein is meant to encompass such colorants, dyes, pigments, and mixtures, unless specified as a particular pigment or other colorant component. The colorant may comprise a pigment, a dye, mixtures thereof, carbon black, magnetite, black, cyan, magenta, yellow, red, green, blue, brown, mixtures thereof. It is to be understood that other useful colorants will become readily apparent based on the present disclosures.

Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical);

HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from Ciba); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, D1351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degussa) Carbon Black 5250 and Carbon Black 5750 (commercially available from Columbia Chemical), and the like, as well as mixtures thereof.

In embodiments the colorant includes at least a quinacridone pigment either alone or in a mixture with other colorants. In other embodiments the colorant includes at least a magenta quinacridone pigment either alone or in a mixture with other colorants. In embodiments, the quinacridone pigment has the following structure:

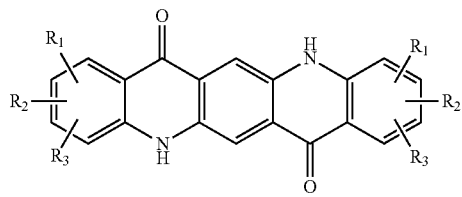

wherein $R_1$, $R_2$, and $R_3$ independently represent H, $C_1$-$C_{20}$ alkyl, $C_1$-$C_{20}$ alkoxy, and halogen.

In embodiments, quinacridone pigments that may be suitable as colorants in phase change inks include C.I. Pigment Violet 30, C.I. Pigment Violet 42, C.I. Pigment Red 202, C.I. Pigment Red 206, C.I. Pigment Red 207, C.I. Pigment Red 209, C.I. Pigment Violet 19, C.I. Pigment Red 122, C.I. Pigment Red 192 and C.I. Pigment Red 282.

The pigments may comprise from about 0.1 to about 25% by weight of the ink composition, such as from about 1 to about 10%, from about 2 to about 6%, or from about 3 to about 5%.

Dispersants

Exemplary ink compositions may include one or more dispersants and/or one or more surfactants for their known properties, such as controlling wetting properties of the ink composition, and stabilizing colorants. Examples of suitable additives that may be used in embodiments include, but are not limited to, MODAFLOW 2100, available from Cytec Surface Specialties, OLOA 1200, OLOA 11000, OLOA 11001, available from Chevron Oronite Company LLC, SOLSPERSE 9000, 16000, 17000, 17940, 18000, 19000, 19240, 20000, 34750, 36000, 39000, 41000, 54000, available from Lubrizol Corporation) and mixtures thereof. Exemplary ink compositions may include one or more dispersants and/or one or more surfactants for their known properties, such as controlling wetting properties of the ink composition, and stabilizing colorants.

The dispersant may comprise from about 0.1 to about 25% by weight of the ink composition, such as from about 0.5 to about 10%, from about 1 to about 6%, or from about 2 to about 5%.

Synergists

In embodiments, the synergist or stabilizer has the same general structure as the pigment it is to stabilize. Thus, synergists may be made using the structures of any suitable pigment. Any suitable functional group may be added to the base pigment structure to form a synergist. In embodiments, a sulfonic or carboxylic group is added to the base pigment structure to form a synergist. Functional groups may be added to the base pigment structure by any method known in the art.

In embodiments, a sulfonic functional group is added to a pigment structure by reacting the pigment with a sulfonating agent, such as fuming sulfuric acid, concentrated sulfuric acid, or chlorosulfuric acid, pure sulfur trioxide and or its complexes with pyridine, dioxane, trimethylamine, triethylamine, thioxane, quinoline dimethylformamide. See, e.g., A. R. Katritzky, M. S. Kim, D. Fedoseyenko, K. Widyan, M. Siskin, M. Francisco, Tetrahedron, 65 (2009) 1111-1114. During the sulfonation, reaction conditions, such as temperature and length of time, are controlled to maximize the rate of introducing the sulfonic acid group onto a pigment molecule. In embodiments, the sulfonation temperature is from about 80 to about 140° C., or from about 90 to about 120° C., such as 100° C. The duration of the sulfonation reaction may be from about 1 to about 24 hours or from about 4 to about 10 hours, such as 6 hours.

In embodiments, it may be desirable to have synergists with only one sulfonic acid group. However, it may be difficult to obtain synergists where only one sulfonic acid group is introduced onto the synergists. It may be the case that the synergists having only one sulfonic acid group attached are present with synergists having multiple sulfonic acid groups attached. In such a case, the synergists having multiple sulfonic acid groups may, if desired, be separated from the synergists having only one sulfonic acid group attached. This separation may be done by any known method, such as ultrafiltration, centrifugation, ion exchange chromatography and the like.

In embodiments, the synergists having multiple sulfonic acid groups and the synergists having only one sulfonic acid group may be dispersed in a fluid, such as water. The synergists having multiple sulfonic acid groups is more readily dissolved in fluid and can be separated by ultrafiltration, thus separating the synergists having multiple sulfonic acid groups from the synergists having only one sulfonic group. The dispersion fluid may be heated to some extent, for example, from about 5° C. to about 80° C., or from about 10° C. to about 60° C., such as 40° C.

In embodiments, the synergists having a sulfonic acid group attached may then be salted out in a solution containing a desired counter ion. The counter ion may be any suitable counter ion, such as a metal- or quaternary ammonium-based ion. The metal may be selected from monovalent metals, such as Na, K, Li, divalent metals Ca, Mg, Ba, Cu, Cd, Zn, Mn and/or trivalent metals such as Al, Cr, and Co. The sulfonated quaternary ammonium based counter ion may be $NH_4$, or any alkyl or aryl quaternary ammonium, such as tetramethyl, terabutyl, teraoctylammonium, teradodecylammonium, tetraoctadecylammonium, N,N-dimethyl dioctadecyl, N,N-dimethyl dioctyl, N,N-dimethyl didecyl, and other suitable materials such as ARQUAD materials available from AKZO NOBEL such as cocoalkyltrimethylammonium from ARQUAD C-35, didecydimethylammonium from ARQUAD 2.10-50, ARQUAD 2.10-70 HFP, 2.10-80, coco(fractionated) dimethylbenzylammonium from ARQUAD MCB 33, 50, 80, hexadecyltrimethylammonium from ARQUAD 16-29, stearyltrimethylammonium from ARQUAD 18-50, behenyltrimethylammonium from ARQUAD 20-80, or salts thereof.

In embodiments, the pigment to be modified into a synergist by adding a sulfonic group or ammonium or metal salt thereof to the pigment structure is a quinacridone pigment. In embodiments, the quinacridone pigment synergist may be of the following general formula (1):

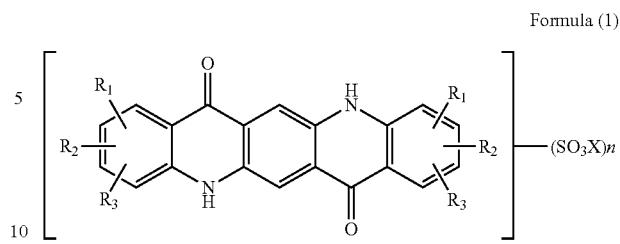

Formula (1)

wherein n is 1, 2, 3, or 4, X represents a metal, ammonium, or quaternary ammonium, $R_1$, $R_2$, and $R_3$ independently represent H, $C_1$-$C_{20}$ alkyl, $C_1$-$C_{20}$ alkoxy, and halogen.

The quaternary ammonium may include alkyl groups with carbon chains of any suitable length. In embodiments the quaternary ammonium includes $C_6$-$C_{40}$ alkyl, $C_{10}$-$C_{30}$ alkyl, or $C_{12}$-$C_{20}$ alkyl, such as $C_{1-8}$ alkyl. In the above formula, the alkyl and alkoxy may be $C_1$-$C_{20}$ alkyl and alkoxy, $C_1$-$C_{10}$ alkyl and alkoxy, or $C_1$-$C_6$ alkyl and alkoxy, such as $CH_3$ and $OCH_3$. In the above formula, the halogen may be any suitable halogen such as F, Cl, Br, or I. In embodiments, the halogen may be Cl or F. In certain embodiments the halogen may be Cl.

In other embodiments, the quinacridone pigment synergist may be of the following formulae (2)-(4):

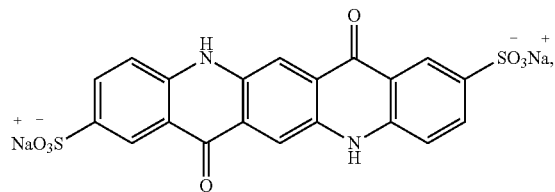

Formula (2)

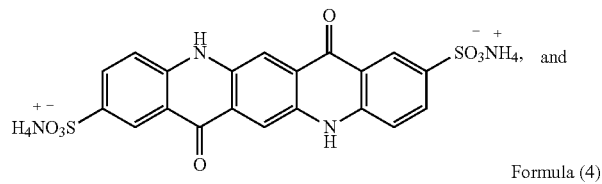

Formula (3)

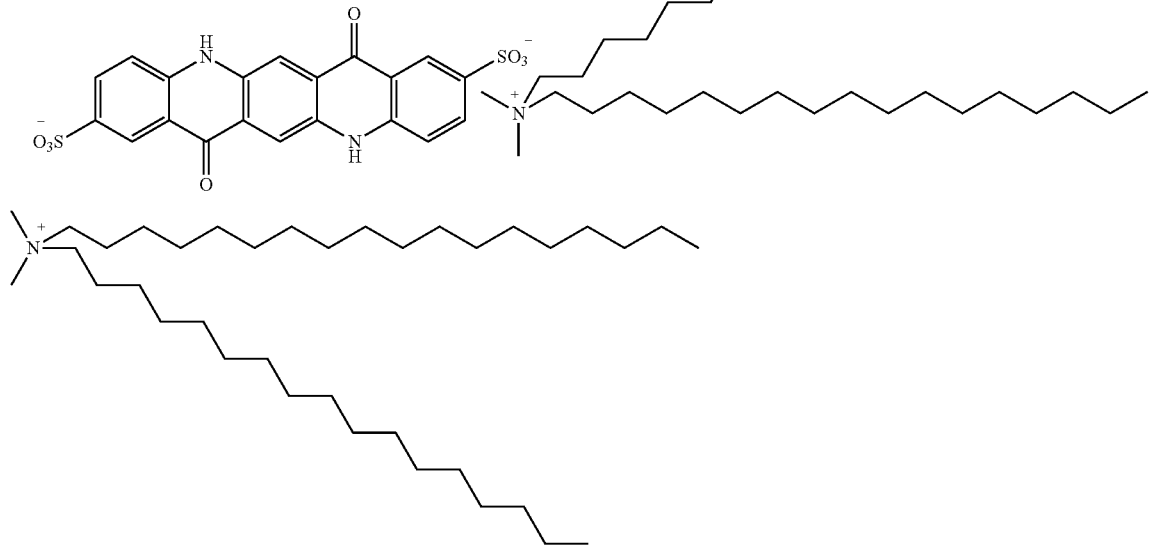

Formula (4)

The synergist may comprise from about 0.01 to about 10% by weight of the ink composition, such as from about 0.05 to about 6%, from about 0.1 to about 3%, or from about 0.3 to about 1%.

In embodiments, the synergist of Formula (4) may be used with quinacridone pigments, such as C.I. Pigment Violet 30, C.I. Pigment Violet 42, C.I. Pigment Red 202, C.I. Pigment Red 206, C.I. Pigment Red 207, C.I. Pigment Red 209, C.I. Pigment Violet 19, C.I. Pigment Red 122, C.I. Pigment Red 192 and C.I. Pigment Red 282.

Antioxidants

The solid ink compositions can also optionally contain an antioxidant. The optional antioxidants of the ink compositions protect the images from oxidation and also protect the ink components from oxidation during the heating portion of the ink preparation process. Specific examples of suitable antioxidant stabilizers include NAUGARD™ 524, NAUGARD™ 635, NAUGARD™ A, NAUGARD™ 1-403, and NAUGARD™ 959, commercially available from Crompton Corporation, Middlebury, Conn.; IRGANOX™ 1010, and IRGASTAB UV 10, commercially available from Ciba Specialty Chemicals; GENORAD 16 and GENORAD 40 commercially available from Rahn AG, Zurich, Switzerland, and the like.

When present, the optional antioxidant is present in the ink compositions of embodiments in any desired or effective amount, such as at least about 0.01% by weight of the ink composition, at least about 0.1% by weight of the ink composition, or at least about 0.5% by weight of the ink composition.

Preparation of Ink Composition

The ink composition may be prepared by any suitable technique. In embodiments the ink compositions may be prepared by first making a pigment concentrate. The pigment concentrate may be made by melting and mixing a wax or combination of waxes, a dispersant, and a synergist. The melting may be caused by any known method, such as melting in an oven, and may occur at any suitable temperature such as from about 100 to about 150° C., or from about 110 to about 130° C., such as about 120° C. The mixing may be initiated by any known means, such as steel ball mixing and/or mixing by an impeller.

Thereafter, the pigment concentrate is slowly added to a wax or a mixture of waxes, a resin or mixture of resins, and, optionally, other additives that had previously been melted and thoroughly mixed. The mixture of wax(es), resin(s), and other optional additives may be mixed at a temperature of from about 100 to about 150° C., or from about 110 to about 130° C., such as about 120° C.

The method of preparation for the ink compositions may be modified so as to accommodate the type of waxes, resins, additives, dispersants, and synergists that are used. For example, the pigment concentrate can be prepared by mixing and melting simultaneously with the other components of the ink composition. Further examples of ink preparation methods are set forth in the Examples below.

In embodiments, the ink compositions may be solid at temperatures of about 60° C., such as about 40° C., such as about 30° C. In particular, the ink composition is solid at room temperature. The ink composition may be a liquid at temperature from about at least 85° C., such as from about at least 90° C., such as at least 95° C. In particular, the ink is a liquid at the jetting temperature.

In embodiments, when the ink composition is a liquid, the viscosity of the ink composition is at most about 30 mPa·s, such as at most about 20 mPa·s, or at most about 15 mPa·s.

When the ink composition is at a jetting temperature, the ink composition has a viscosity of less than about 15 mPa·s, such as less than about 12 mPa·s, from about 3 to about 12 mPa·s, or from about 5 to about 10 mPa·s. In particular embodiments, the ink compositions are jetted at temperatures of less than about 150° C., such as from about 90° C. to about 130° C., or from about 100° C. to about 120° C., such as about 115° C.

A printing ink is generally formulated according to strict performance requirements demanded by the intended market application and required properties. Whether formulated for office printing or for production printing, a particular ink is expected to produce images that are robust and durable under stress conditions. In a typical design of a piezoelectric ink jet printing device, the image is applied by jetting appropriately colored inks during a number of rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

The present solid inks, as well as the methods herein, may be employed with any desired printing system and marking material suitable for applying a marking material in an imagewise pattern directly to an image receiving recording medium or to an intermediate transfer member, such as ink jet printing, thermal ink jet printing, piezoelectric ink jet printing, acoustic ink jet printing, thermal transfer printing, gravure printing, electrostatographic printing methods, and the like

EXAMPLES

Heretofore "parts" refers to parts by weight.
Preparation of Synergists
Preparation of the Synergist of Formula 2

The synergist of Formula 2 is prepared by reacting pigment Violet 19 with concentrated sulfuric acid 95-98% at a temperature of 100° C. with a an overhead stirrer for a duration of six hours. The resulting compound is then reacted with saturated sodium chloride solution 35% by weight at a temperature of 25° C. stirred with a an overhead stirred for a duration of one hour.

When evaluated via Fourier transform infrared (FTIR) spectra and compared with the FTIR spectra of Pigment Violet 19, the synergist of Formula 2 has a band due to $SO_3$ asymmetric stretching vibration of sulfonic acid salts is generally known to occur at 1250-1140 $cm^{-1}$. That particular band is usually broad with shoulders, and it is very visible on the FTIR spectra of the synergist according to Formula 2. The band due to the $SO_3$ symmetric stretching vibration is visible on the FTIR spectra of the synergist according to Formula 2 at 1070-1030 $cm^{-1}$. The spectra of the synergist according to Formula 2 also indicates the presence of hydrated sulfonic acid groups, i.e. —$SO_3^-H_3O^+$. The band due to the OH stretching vibration of hydrated sulfonic acids is very broad having several maxima and can be found in the region 2800 $cm^{-1}$ to 1650 $cm^{-1}$.

The shape of the N—H stretching sub maxima of the synergist according to Formula 2 was less symmetric than for the PV19 Hostapenn Red (Quinacridone). The polymorph could be beta-1 type (See D. S. Filho, C. M. F. Oliveira, "Crystalline modifications of linear trans-quinacridone pigments", Journal of Materials Science 27 (1992) 5101-5107).

Preparation of Synergist of Formula 3

The synergist of Formula 3 is prepared by reacting pigment Violet 19 with concentrated sulfuric acid 95-98% at a temperature of 100° C. stirred with an overhead stirrer for a duration of six hours. The resulting compound is then reacted with ammonium hydroxide 28% at a temperature below 40° C. stirred with an overhead stirrer for a duration of one hour.

In the FTIR spectra of the synergist according to Formula 3, the ammonium salt ($NH_4^+$) has a strong peak between 3300-3030 $cm^{-1}$ due to N—H stretching. Also the ammonium salt is present in the region of 1430-1390 $cm^{-1}$ due to N—H deformation. The band due to $SO_3$ asymmetric stretching is observed between 1250-1140 $cm^{-1}$.

Preparation of the Synergist of Formula 4

The synergist of Formula 4 is prepared by reacting pigment Violet 19 with concentrated sulfuric acid 95-98% at a temperature of 100° C. stirred with an overhead stirrer for a duration of six hours. The resulting compound is then reacted with saturated sodium chloride solution 35% by weight at a temperature of 25° C. stirred with an overhead stirrer for a duration of one hour. The resulted sodium salt is mixed using a magnetic stirrer with N,N-dimethyldioctadecyl bromide at a temperature of 80° C. to produce synergist 4.

In the FTIR spectra of the synergist according to Formula 4, the Compound according to Formula 4 had strong FTIR bands at 2920 $cm^{-1}$ (asymmetric $CH_2$ stretching) and 2850 $cm^{-1}$ (symmetric $CH_2$ stretching) due to the long alkyl tails of the N,N-dimethyl-dioctadecyl cation. The compound according to Formula 4 is not water soluble, which suggests the presence of the large cation.

Comparative Example 1

Preparation of Pigment Concentrate

To prepare the pigment concentrate, 89.1 parts KEMAMIDE S-180 (a stearyl stearamide) commercially available from Crompton Corporation, 30.9 parts of a triamide wax (triamide described in U.S. Pat. No. 6,860,930) and 26.7 parts SOLSPERSE 17000 commercially available from Lubrizol Corporation were added to a 600 mL beaker, The materials were melted in an oven at 120° C., then transferred to a Szevari 01 attritor, available from Union Process, that was also heated to 120° C., and charged with 1800 g 440 C type ⅛ inch diameter stainless steel balls available from Hoover Precision Products. A heated impeller was attached to the assembly whereupon the impeller speed was adjusted such that the stainless steel balls at the top of the vessel began to tumble gently over each other, To this stirring mixture were slowly added 13.3 parts of a Pigment Red 122 available from Clariant. After 30 minutes of wetting at this speed, the impeller speed was increased such that the impeller's peripheral velocity was about 150 centimeters per second whereupon the attrition was continued for 18 hours.

Preparation of Solid Ink Containing the Pigment Concentrate

The concentrate was isolated from the stainless steel balls via a sieve such that 45.0 parts were placed into a pre-heated vessel with pre-heated stirrer bar and allowed to stir for 10 minutes. To this were slowly added, having already been melted and thoroughly mixed at 120° C., 76.0 parts of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, as described in U.S. Pat. No. 7,407,539) from Baker Petrolite, 8.7 parts triamide wax (triamide described in U.S. Pat. No. 6,860,930), 17.5 parts KE-100 resin commercially available from Arakawa Corporation, 1.6 parts of a urethane resin that is the adduct of three equivalents of stearyl isocyanate and a glycerol-based alcohol, prepared as described in Example 4 of U.S. Pat. No. 6,309,453, the disclosure of which is totally incorporated herein by reference, and 0.2 parts Naugard-445 (an antioxidant) available from Crompton Corp. The resultant ink was stirred for 2 hours at 120° C.

Comparative Example 2

A pigment concentrate was made in a similar manner as in Comparative Example 1 except that 1.33 parts of SOLSPERSE 22000, available from Lubrizol Corporation, was also added after adding the Pigment Red 122. A pigmented ink was then made in a similar manner as in Comparative Example 1.

Example 1

A pigment concentrate was made in a similar manner as in Comparative Example 2 except that 1.33 parts of the synergist as disclosed in Formula 2 was added instead of Solsperse 22000. A pigmented ink was then made in a similar manner as in Comparative Example 1.

Example 2

A pigment concentrate was made in a similar manner as in Comparative Example 2 except that 1.33 parts of the synergist as disclosed in Formula 4 was added instead of Solsperse 22000. A pigmented ink was then made in a similar manner as in Comparative Example 1.

Results

Shown below in Table 1 are rheological results of the above inks at 115° C. as they were measured using a 50 millimeter cone and plate geometry on a RFS-III rheometer, available from Rheometrics Corporation. The table outlines the dynamic viscosities obtained at 0.1 and 10 Hertz (Hz). An appropriate target viscosity of the ink is approximately 10 centipoise and better Newtonian behavior is realized when the viscosities of each of these frequency extremes are similar to each other.

TABLE 1

Rheologies of inks at 115° C.

| Ink # | Synergist Type | Viscosity @ 0.1 Hz | Viscosity @ 10 Hz |
|---|---|---|---|
| Comparative Example 1 | None | 536.15 | 30.64 |
| Comparative Example 2 | Solsperse 22000 | 12.47 | 10.25 |
| Example 1 | Formula 2 | 10.86 | 9.97 |
| Example 2 | Formula 4 | 11.75 | 9.47 |

As stated previously, quinacridone pigments are very difficult to disperse and stabilize in low polarity ink vehicles, as is evident from the rheological results of Comparative Example 1 in Table 1. Therefore a synergist may be used to aid the dispersion of the quinacridone pigment into an ink vehicle. Unfortunately, there are no commercially available magenta synergists for quinacridone pigments, An available yellow synergist, Solsperse 22000 from Lubrizol Corporation, was used in an effort to help stabilize the quinacridone particles in low polarity inks. The rheological results of Comparative Example 2 in Table 1 indicated marked improvement in the rheology compared to that of Comparative Example 1 where no synergist was used. In contrast to those rheological results of the aforementioned inks; the ink of Example 1 formulated with the synergist of Formula 1 had even lower viscosity and better Newtonian behavior.

The graph in FIG. 1 shows the difference in particle size stability of inks held at 120° C. for several days; one was prepared with Solsperse 22000 (Comparative Example 2) as a synergist and the other contained the quinacridone-based synergist shown in Formula 2 (Example 1). The Example 1 ink prepared with the synergist of Formula 2 showed very stable and small particle size over a period of eight days at 120° C.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink composition comprising:
an ink vehicle;
a pigment; and
a synergist having the following formula (4):

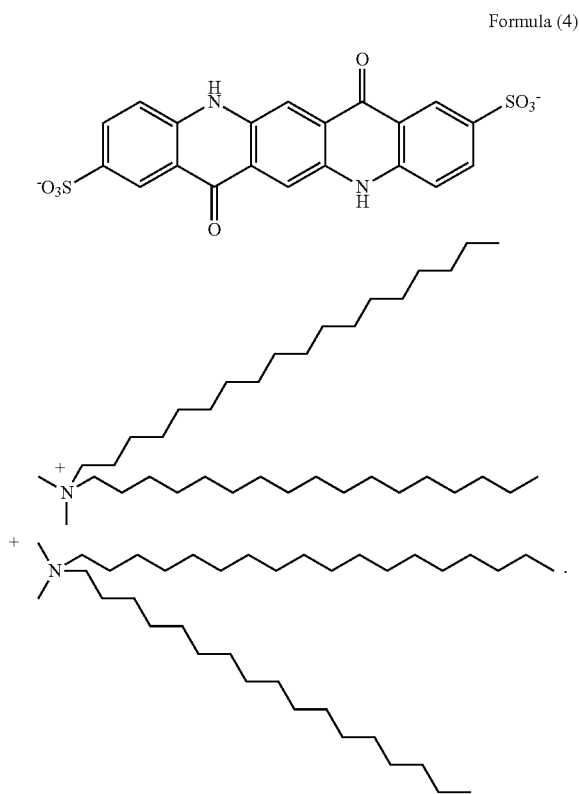

Formula (4)

2. The ink composition according to claim 1, wherein the viscosity of the ink composition is from about 5 to about 20 mPa.s at jetting temperature.

3. The ink composition according to claim 1, wherein the ink composition is liquid at a temperature of at least 85° C.

4. The ink composition according to claim 1, wherein the synergist is present in an amount from about 0.01 to about 10% by weight of the ink composition.

5. The ink composition according to claim 1, further comprising a dispersant that is present in an amount from about 0.1 to about 25% by weight of the ink composition.

6. The ink composition according to claim 1, wherein the pigment is a quinacridone pigment.

7. The ink composition according to claim 6, wherein the quinacridone pigment is selected from the group consisting of C.I. Pigment Violet 19, C.I. Pigment Red 122, and C.I. Pigment Red 282.

8. The ink composition according to claim 1, wherein the synergist is salted out from a solution using a quaternary ammonium based counter ion selected from the group consisting of cocoalkyltrimethylammonium, hexadecyltrimethylammonium, stearyltrimethylammonium, behenyltrimethylammonium, and salts thereof.

9. A printing apparatus comprising:
a printhead; and
an ink composition comprising:
an ink vehicle;
a pigment; and
a synergist having the following formula (4):

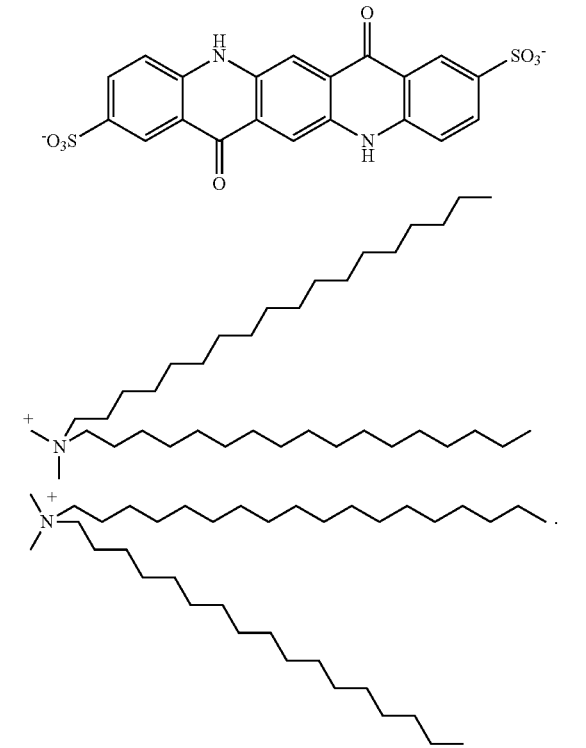

Formula (4)

10. The printing apparatus of claim 9, wherein the printhead jets the ink composition at temperatures from about 80° C. to less than about 150° C.

11. The printing apparatus of claim 9, wherein the printing apparatus is a direct printing apparatus.

12. The printing apparatus of claim 9, wherein the printing apparatus is a transfer printing apparatus.

13. The printing apparatus of claim 9, wherein the printing apparatus is piezoelectric ink jet printing apparatus.

* * * * *